BEQUERET & DEMOULIN.
Gang-Plow.

No. 59,813.  Patented Nov. 20, 1866.

Witnesses:
Theo. Tusch
J. A. Service

Inventors:
D. Bequeret
C. Demoulin
Per Munn & Co.
Attorneys

United States Patent Office.

IMPROVEMENT IN GANG PLOUGHS.

D. BEQUERET AND E. DEMOULIN, OF JAMESTOWN, ILLINOIS.

Letters Patent No. 59,813, dated November 20, 1866.

SPECIFICATION.

TO ALL WHOM IT MAY CONCERN:

Be it known that we, D. BEQUERET and E. DEMOULIN, of Jamestown, in the county of Clinton, and State of Illinois, have invented a new and useful Improvement in Gang Ploughs; and we do hereby declare that the following is a full, clear, and exact description thereof, which will enable others skilled in the art to make and use the same, reference being had to the accompanying drawing forming a part of this specification, in which—

Similar letters of reference indicate like parts.

Figure 1:
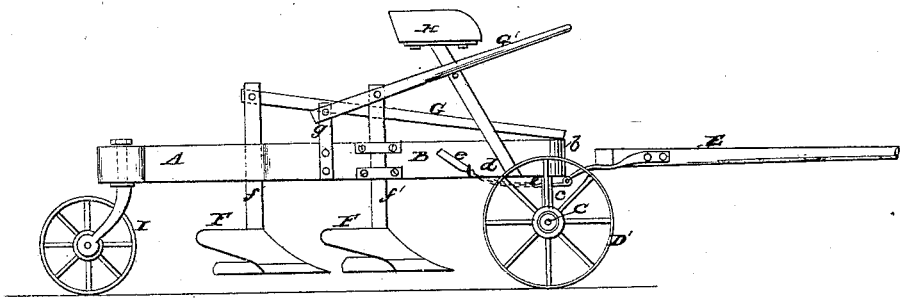
Figure 1 represents a side elevation of this invention.
Figure 2:
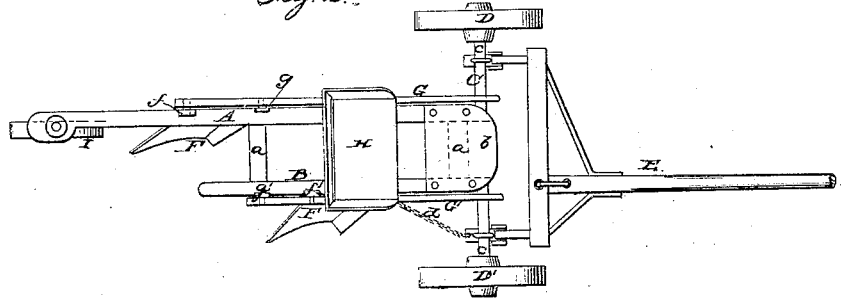
Figure 2 is a plan or top view of the same.

This invention relates to a gang plough of that class in which two or more ploughshares are employed which are adjustable up and down by hand levers from the driver's seat. Said ploughshares are attached to beams of unequal length, which are connected in front and supported by an axle the ends of which are bent to form cranks of unequal length, allowing one wheel to run in the furrow and the other on the firm land without throwing the plough out of a level position. The draught-pole is in line with the shortest beam, and consequently out of the middle of the plough, so as to enable the draught-animals to walk in a convenient position. The rear end of the longest beam is supported by a caster-wheel, and a chain extending from the outside of the short beam to the front axle facilitates the operation of turning the plough. A represents the long beam of our plough, which connects with the short beam, B, by two cross-bars, a, one near the middle of said long beam and one at its front end, which latter is in line with the front end of the short beam. Said front ends of both beams are protected by a semicircular cap, b, and they are supported by an axle, C, which connects with the beams by a king-bolt so that it is free to turn in each direction like the front axle of an ordinary wagon or carriage. The ends of this axle are bent to form cranks, $c\ c'$, of unequal length so that the plough will not be thrown out of a level if one wheel runs in a furrow and the other on the unploughed land. The wheels D D' are of uniform diameter, and they are secured to the ends of the cranks $c\ c'$ as shown in the drawing. To the axle C is attached the draught-pole E, and said draught-pole is in line with the short beam B, and a chain, d, connects that end of the axle which projects beyond the side of the short beam, with a hook, e, secured to said short beam so that the plough can be readily and easily turned in a short curve. The ploughshares F F' are attached to standards $f\ f'$ which slide up and down in suitable guides or grooves at the outer surfaces of the beams A B and levers G G' serve to raise and lower the shares. These levers are so situated that they can be conveniently operated from the driver's seat H, and the driver is enabled to raise both shares simultaneously or each independently of the other, as may be desirable. The levers G G' have their fulcra or standards $g\ g'$, which are secured to the beams A B, and by the position of these standards in relation to the ploughshares said levers are brought in such a position that one can be operated by the foot and the other by hand. The rear end of the long beam is supported by a caster-wheel, I, which is free to turn in either direction, and which accommodates itself readily to the direction in which the plough moves. By these means a plough is obtained which is very light, durable, and easily operated.

We claim as new, and desire to secure by Letters Patent—

A plough composed of a long and a short beam, with ploughshares F F', which are operated by levers G G' in combination with the unequal crank-axle C, draught-pole E placed in line with the short beam and with the caster-wheel I, all constructed and operating substantially as and for the purpose set forth.

D. BEQUERET,
E. DEMOULIN.

Witnesses:
ADOLPH MILLER,
JOHN M. RAMSAY.